United States Patent
Konno et al.

(10) Patent No.: US 6,562,929 B2
(45) Date of Patent: May 13, 2003

(54) CONJUGATED DIENE-BASED RUBBER AND METHOD OF PRODUCING THE SAME, OIL EXTENDED RUBBER AND RUBBER COMPOSITION CONTAINING THE SAME

(75) Inventors: Tomohisa Konno, Tokyo (JP); Yoshiyuki Udagawa, Tokyo (JP); Toshihiro Tadaki, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/940,503

(22) Filed: Aug. 29, 2001

(65) Prior Publication Data
US 2002/0052435 A1 May 2, 2002

(30) Foreign Application Priority Data

Aug. 30, 2000 (JP) ........................................ 2000-261715

(51) Int. Cl.$^7$ ............................................. C08F 236/12
(52) U.S. Cl. ........................... 526/338; 526/79; 526/87; 526/295; 526/313; 526/329.1; 526/331; 526/335; 525/105; 524/552; 524/562; 524/563; 524/565; 524/566
(58) Field of Search ............................ 526/79, 338, 87, 526/295, 313, 329.1, 331, 335; 525/105; 524/565, 566, 552, 562, 563

(56) References Cited

U.S. PATENT DOCUMENTS

| | | | | |
|---|---|---|---|---|
| 2,554,268 A | * | 5/1951 | Rose et al. | 526/338 X |
| 4,157,319 A | * | 6/1979 | Fenney et al. | 526/338 X |

FOREIGN PATENT DOCUMENTS

| | | | | |
|---|---|---|---|---|
| GB | 609012 | * | 9/1948 | ........... 526/338 |
| JP | 9-208623 | | 8/1997 | |
| JP | 9-208633 | | 8/1997 | |
| WO | WO 96/23027 | | 8/1996 | |

* cited by examiner

Primary Examiner—Fred Teskin
(74) Attorney, Agent, or Firm—Oblon, Spivak, McClelland, Maier & Neustadt, P.C.

(57) ABSTRACT

An objective of the invention is to provide a conjugated diene-based rubber having a specific composition and a method of producing the same, an oil extended rubber using the same, as well as a rubber composition capable of being converted into a vulcanized rubber which has a low rolling resistance, an excellent wearing resistance and the like, and is useful, for example, as a tire or the like. A conjugated diene-based rubber in the invention has a glass transition point of −60 to 0° C., an olefinically unsaturated nitrile monomer unit randomly contains in its molecular chain, its repeating units consists of 9 to 30% by mass of an olefinically unsaturated nitrile monomer unit such as acrylonitrile, 10 to 50% by mass of an aromatic vinyl monomer unit such as styrene and 20 to 81% by mass of a conjugated diene monomer unit such as 1,3-butadiene, and its Mooney viscosity [$ML_{1+4}$(100° C.)] is 20 to 200. An oil extended rubber in the invention comprises 100 parts by mass of the conjugated diene-based rubber and 10 to 60 parts by mass of an extending oil. A rubber composition in the invention comprises a rubber component containing a conjugated diene-based rubber, and an inorganic filler such as a silica and/or a carbon black.

22 Claims, 1 Drawing Sheet

CONJUGATED DIENE-BASED RUBBER AND METHOD OF PRODUCING THE SAME, OIL EXTENDED RUBBER AND RUBBER COMPOSITION CONTAINING THE SAME

TITLE OF THE INVENTION

Conjugated diene-based rubber and method of producing the same, oil extended rubber and rubber composition containing the same

1. Field of the Invention

The present invention relates to a conjugated diene-based rubber capable of being converted into a vulcanized rubber having a low rolling resistance, an excellent wet skid property, sufficient wearing resistance, tensile strength and the like when incorporating an inorganic filler such as a silica as a reinforcing agent and a method of producing the same, and also to an oil extended rubber containing a conjugated diene-based rubber and an extending oil. The present invention also relates to a rubber composition comprising a conjugated diene-based rubber or an oil extended rubber described above and an inorganic filler and having an excellent processability. This rubber composition gives a vulcanized rubber which is useful especially as a tire tread.

2. Description of the Prior Art

In response to recent demand for low gas mileage of automobile, rubber material such as a conjugated diene-based rubber or the like capable of giving a rubber composition for a tire which has low rolling resistance, excellent wearing resistance and destruction characteristics and whose wet skid resistance, which is a representative index of a driving stability, is high is desired.

Tire rolling resistance can be reduced by lowering hysteresis loss of vulcanized rubber. The hysteresis loss can be evaluated based on various properties. For example, compositions preferably have high impact resilience at 50–80° C., a low tanδ at 50–80° C. or low Goodrich heat release. Compositions with low hysteresis loss include natural rubber, isoprene rubber, butadiene rubber and the like, but these are also associated with the problem of low wet skid resistance.

In recent years, there have been proposed methods of using inorganic filler such as silica and the like to serve as reinforcing agent, or combining inorganic filler with carbon black. Tire treads employing inorganic filler or both inorganic filler and carbon black have low rolling resistance and excellent driving stability, represented by, for example, the wet skid resistance. However, they exhibit a problem of poor wearing resistance, tensile strength and the like for the vulcanized rubber. The cause is believed to be the fact that the affinity of inorganic filler for the conjugated diene-based rubber is lower than that of carbon black, such that a sufficient reinforcing effect cannot be achieved.

In order to increase the affinity between the silica as an inorganic filler and the conjugated diene-based rubber, it has been attempted to use conjugated diene-based rubbers introduced therein functional group with affinity for inorganic filler. For example, there have been proposed a conjugated diene-based rubber introduced a hydroxyl group therein (WO96/23027), a conjugated diene-based rubber introduced an alkoxysilyl group therein (Japanese Patent laid-open publication No. HEI-9-208623) and a conjugated diene-based rubber introduced an alkoxysilyl group and an amino and/or a hydroxyl group therein (Japanese Patent laid-open publication No. HEI-9-208633). However, most conjugated diene-based rubbers with such an introduced functional group exhibit strong interaction with an inorganic filler when the inorganic filler is combined therewith, and this creates such problems as impaired dispersion of the inorganic filler, greater heat release during processing, poor processability and the like.

SUMMARY OF THE INVENTION

The present invention solves the problems associated with a prior art described above and is intended to provide a conjugated diene-based rubber and an oil extended rubber, each of which is capable of being converted into a vulcanized rubber having a low rolling resistance, an excellent wet skid property and sufficient wearing resistance, tensile strength, and the like. Another aspect of the invention is intended to provide a rubber composition capable of being converted into a vulcanized rubber which has an excellent processability and is useful as a tire tread of an automobile or the like.

A rubber composition for formation of a tire tread and the like usually contains a reinforcing agent for the purpose of improving tensile strength and wear resistance, but silica and similar substances do not easily disperse uniformly because of their tendency to aggregate. When using a rubber composition in which the reinforcing agent is not uniformly dispersed, the desired effect of including the reinforcing agent cannot be achieved, while the processability is also notably impaired. For this reason, it has generally been attempted to improve the dispersion properties by also including a silane coupling agent when using a silica as an inorganic filler.

It was discovered that by using a conjugated diene-based rubber having a certain composition in which an unsaturated nitrile monomer unit is contained in a molecular chain a sufficient improvement in the wearing resistance, the tensile strength, and the like as well as the processability can be achieved even with a reduced amount of a silane coupling agent or rather without any silane coupling agent.

The present invention is based on the findings described above and can be described as follows.

1. A conjugated diene-based rubber obtained by copolymerizing monomers containing an olefinically unsaturated nitrile monomer, an aromatic vinyl monomer and a conjugated diene monomer, and is characterized in that the glass transition point of the above-mentioned conjugated diene-based rubber is −60 to 0° C., the difference between the extrapolated temperatures of the initiation and the termination of the above-mentioned glass transition is 20° C. or less, that has a repeating unit comprising ① 9 to 30% by mass of an olefinically unsaturated nitrile monomer unit, ② 10 to 50% by mass of an aromatic vinyl monomer unit and ③ 20 to 81% by mass of a conjugated diene monomer unit [where the total of ①, ② and ③ is 100% by mass], and that Mooney viscosity [$ML_{1+4}$ (100° C.)] is 20 to 200.

2. A method for producing a conjugated diene-based rubber by copolymerizing monomers containing an olefinically unsaturated nitrile monomer, an aromatic vinyl monomer and a conjugated diene monomer, and is characterized in that polymerization is carried by adding the above-mentioned olefinically unsaturated nitrile monomer portionwise to polymerization system and then by adding the remainder of the above-mentioned olefinically unsaturated nitrile monomer intermittently to polymerization system in the case conversion of the total of the charged monomer measured in the course of polymerization is reached 10 to 95%.

3. A method for producing a conjugated diene-based rubber according to 2 above wherein, the initial amount of the above-mentioned olefinically unsaturated nitrile monomer charged before polymerization is preferably 20 to 95% by mass with respect to the total amount of the above-mentioned olefinically unsaturated nitrile monomer to be prepared.

4. A method for producing a conjugated diene-based rubber by copolymerizing monomers containing an olefinically unsaturated nitrile monomer, an aromatic vinyl monomer and a conjugated diene monomer, and is characterized in that polymerization is carried by adding the above-mentioned olefinically unsaturated nitrile monomer portionwise to polymerization system and then by adding the remainder of the above-mentioned olefinically unsaturated nitrile monomer continuously to polymerization system in the case conversion of the total of the charged monomer measured in the course of polymerization is reached 10 to 95%.

5. A method for producing a conjugated diene-based rubber according to 4 above wherein, the initial amount of the above-mentioned olefinically unsaturated nitrile monomer charged before polymerization is preferably 20 to 95% by mass with respect to the total amount of the above-mentioned olefinically unsaturated nitrile monomer to be prepared.

6. An oil extended rubber being characterized in that comprising 100 parts by mass of a conjugated diene-based rubber which is obtained by copolymerizing monomers containing an olefinically unsaturated nitrile monomer, an aromatic vinyl monomer and a conjugated diene monomer, whose the glass transition point of the above-mentioned conjugated diene-based rubber is −60 to 0° C., whose difference between the extrapolated temperatures of the initiation and the termination of the above-mentioned glass transition is 20° C. or less, whose repeating unit is comprised ① 9 to 30% by mass of an olefinically unsaturated nitrile monomer unit, ② 10 to 50% by mass of an aromatic vinyl monomer unit and ③ 20 to 81% by mass of a conjugated diene monomer unit [where the total of ①, ② and ③ is 100% by mass], and whose Mooney viscosity [$ML_{1+4}$ (100° C.)] is 40 to 200, and 10 to 60 parts by mass of an extending oil.

7. A rubber composition being characterized in that comprising 100 parts by mass of a rubber component containing a conjugated diene-based rubber obtained by copolymerizing monomers containing an olefinically unsaturated nitrile monomer, an aromatic vinyl monomer and a conjugated diene monomer, whose the glass transition point of the above-mentioned conjugated diene-based rubber is −60 to 0° C., whose difference between the extrapolated temperatures of the initiation and the termination of the above-mentioned glass transition is 20° C. or less, whose repeating unit is comprised ① 9 to 30% by mass of an olefinically unsaturated nitrile monomer unit, ② 10 to 50% by mass of an aromatic vinyl monomer unit and ③ 20 to 81% by mass of a conjugated diene monomer unit [where the total of ①, ② and ③ is 100% by mass], and whose Mooney viscosity [$ML_{1+4}$ (100° C.)] is 20 to 200, and 10 to 200 parts by mass of at least one selected from an inorganic filler and a carbon black.

8. A rubber composition according to 7 above wherein the above-mentioned inorganic filler is a silica.

9. A rubber composition according to 8 above further comprising a silane coupling agent.

10. A rubber composition according to 8 above wherein the above-mentioned conjugated diene-based rubber is in an amount of at least 30 parts by mass in the total of the above-mentioned rubber component of 100 parts by mass, and the amount of the above-mentioned silica is 30 to 100 parts by mass and/or the amount of the above-mentioned carbon black is 10 to 100 parts by mass based on 100 parts by mass of the total of the above-mentioned rubber component.

11. A rubber composition according to 10 above further comprising a silane coupling agent.

12. A rubber composition according to 7 above further comprising 10 to 60 parts by mass of an extending oil based on 100 parts by mass of the above-mentioned rubber component and the Mooney viscosity [$ML_{1+4}$ (100° C.)] of the above-mentioned conjugated diene-based rubber is 40 to 200.

13. A rubber composition according to 12 above wherein the above-mentioned inorganic filler is a silica.

14. A rubber composition according to 13 above further comprising a silane coupling agent.

15. A rubber composition according to 12 above wherein the above-mentioned conjugated diene-based rubber is in an amount of at least 30 parts by mass in the total of the above-mentioned rubber component of 100 parts by mass, and the amount of the above-mentioned silica is 30 to 100 parts by mass and/or the amount of the above-mentioned carbon black is 10 to 100 parts by mass based on 100 parts by mass of the total of the above-mentioned rubber component.

16. A rubber composition according to 15 above further comprising a silane coupling agent.

A rubber composition of the present invention has a satisfactory processability and gives a rubber product having a low rolling resistance, a vulcanized rubber having an excellent wet skid property, sufficient wearing resistance, tensile strength and the like, which is useful especially as a tire. A conjugated diene-based rubber and an oil extended ruber of the invention are useful in producing a rubber composition described above.

DETAILED DESCRIPTION OF THE INVENTION

A conjugated diene-based rubber according to the invention is a copolymer obtained by copolymerizing an olefinically unsaturated nitrile monomer (hereinafter referred to as Monomer (a)), an aromatic vinyl monomer (hereinafter referred to as Monomer (b)) and a conjugated diene monomer (hereinafter referred to as Monomer (c)), and preferably is a random copolymer.

Monomer (a) may be used acrylonitrile, methacrylonitrile and the like. Among these, acrylonitrile is preferred. Any of these Monomers (a) may be used alone or in combination of two or more.

The monomer unit formed by Monomer (a), in a repeating unit constituting the conjugated diene-based rubber, is in an amount of 9 to 30% by mass, preferably 9 to 20% by mass, more preferably 9 to 15% by mass. An amount of the monomer unit formed by Monomer (a) less than 9% by mass leads to a poor distribution of an inorganic filler, resulting in an insufficiently improved wearing resistance or the like of a vulcanized rubber obtained. On the other hand, an amount exceeding 30% by mass leads to a poor low temperature performance of a vulcanized rubber obtained.

Monomer (b) may be used styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene and the like. Among these, styrene is preferred. Any of these Monomers (b) may be used alone or in combination of two or more.

The monomer unit formed by Monomer (b), in a repeating unit constituting a conjugated diene-based rubber, is in an amount of 10 to 50% by mass, preferably 15 to 40% by mass. An amount of the monomer unit formed by Monomer (b) less than 10% by mass leads to a reduced wearing resistance of a vulcanized rubber obtained. On the other hand, an amount exceeding 50% by mass leads to a reduced repelling elasticity of a vulcanized rubber obtained, resulting in an increased tan$\delta$.

Monomer (c) may be used 1,3-butadiene, isoprene, 2,3-dimethyl-1,3-butadiene, chloroprene and the like. Among these, 1,3-butadiene and isoprene are especially preferred. Any of these Monomers (c) may be used alone or in combination of two or more.

The monomer unit formed by Monomer (c), in a repeating unit constituting a conjugated diene-based rubber, is in an amount of 20 to 81% by mass, preferably 50 to 80% by mass. An amount of the monomer unit formed by Monomer (c) less than 20% by mass leads to a reduced repelling elasticity of a vulcanized rubber obtained, resulting in an increased tan$\delta$.

A conjugated diene-based rubber may be obtained by copolymerizing any of various ester-based monomers in addition to Monomers (a), (b) and (c).

Such ester-based monomer may be used a (meth)acrylate such as methyl (meth)acrylate, ethyl (meth)acrylate, n-propyl (meth)acrylate, isopropyl (meth)acrylate, n-amyl (meth)acrylate, n-hexyl (meth)acrylate, 2-ethylhexyl (meth) acrylate, cyclohexyl (meth)acrylate and the like as well as a vinyl ester such as vinyl acetate or the like. While such ester-based monomer can be used in an amount by which the characteristics of the conjugated diene-based rubber is not affected adversely, the monomer unit formed by the ester-based monomer is preferably in an amount of 20% by mass or less based on the total monomer units.

The conjugated diene-based rubber in the invention may be used acrylonitrile-butadiene-styrene copolymer and the like.

While the "glass transition point" of the conjugated diene-based rubber may vary depending on the composition of the monomers employed, it is –60 to 0° C., preferably –50 to –10° C., when determined by a differential scanning calorimeter (DSC) in accordance with ASTM D3418-82 (reapproved 1988). In addition, the difference between the extrapolated temperatures of the initiation and the termination of the glass transition is 20° C. or less, preferably 18° C. or less, more preferably 15° C. or less, most preferably 13° C. or less. The lower limit is generally 5° C. A difference exceeding 20° C. leads a vulcanized rubber having a reduced wet skid resistance and an increased tan$\delta$, which are not preferable. Preferable combination is 9 to 15% by mass of monomer unit formed by Monomer (a) and 13° C. or less, more preferably 10° C. or less of the difference between the extrapolated temperatures of the initiation and the termination of the glass transition.

The "Mooney viscosity" [$ML_{1+4}$ (100° C.)] of the conjugated diene-based rubber is 20 to 200, preferably 30 to 150. The Mooney viscosity less than 20 leads to a reduced wearing resistance of a vulcanized rubber obtained. On the other hand, the viscosity exceeding 200 leads to a poor processability of a rubber composition containing this conjugated diene-based rubber.

The weight-average molecular weight of the conjugated diene-based rubber represented as polystyrene determined by a gel permeation chromatography (GPC) is preferably 100,000 or more, particularly 100,000 to 2,000,000. The weight-average molecular weight less than 100,000 may lead to a reduced wearing resistance of a vulcanized rubber obtained, which may results in an increased tan$\delta$. On the other hand, the molecular weight exceeding 2,000,000 may lead to a poor processability of a rubber composition containing this conjugated diene-based rubber. This weight-average molecular weight can be controlled during polymerization by using a chain transferring agent such as an alkylmercaptan employed commonly in a radical polymerization.

The conjugated diene-based rubber can be produced by polymerizing Monomers (a), (b) and (c) optionally with an ester-based monomer in the presence of a radical initiator in an aqueous medium. While the polymerization method is not particularly limited, it is preferably an emulsion polymerization in an usual case. Such emulsion polymerization may be performed by any ordinary method, such as a method in which a certain monomer is emulsified in an aqueous medium in the presence of an emulsifier and the polymerization is initiated using a radical initiator and then terminated using an inhibitor once a predetermined conversion is achieved.

Process of charging Monomer (a) is important in the invention and it is preferable that Monomer (a) is added to portionwise polymerization system. In a preferred manner of adding Monomer (a), its portion is added prior to the initiation of the polymerization and the remainder is then added to the polymerization system intermittently or continuously over the polymerization process, or its entire amount is added to the polymerization system intermittently or continuously over the polymerization process. After conversion of the total of the charged monomer measured in the course of polymerization is reached 10 to 95%, preferably 20 to 80%, it is desirable to add the remainder of Monomer (a) at a once, portionwise, or continuously. If Monomer (a) is copolymerized by charging the entire amount of it before polymerization, it is not preferable that the difference between the temperatures of the initiation and the termination of the glass transition of the copolymeric rubber tends to exceed 20° C. Since a higher conversion of the polymerization may leads to a gelation, it is preferable to keep the conversion of the polymerization at 80% or less.

The initial amount of Monomer (a) charged before polymerization is preferably 20 to 95% by mass, more preferably 25 to 90% by mass, most preferably 30 to 85% by mass with respect to the total amount of Monomer (a) to be prepared.

An emulsifier may be used an anionic surfactant, a nonionic surfactant, a cationic surfactant, an amphoteric surfactant and the like. A fluorine-based surfactant may also be employed. Any of these emulsifiers may be used alone or in combination of two or more. Among these emulsifiers, those employed frequently are anionic surfactants, such as a potassium or sodium salt or the like of a long chain fatty acid having 10 or more carbon atoms such as capric acid, lauric acid, myristic acid, palmitic acid, oleic acid, stearic acid, and the like, as well as a rosin acid salt or the like.

A radical initiator may be used an organic peroxide such as benzoyl peroxide, lauroyl peroxide, tert-butyl hydroperoxide, cumene hydroperoxide, p-menthane hydroperoxide, di-tert-butyl peroxide, dicumyl peroxide, and the like. Those which may also be employed are an azo compound such as azobisisobutyronitrile, an inorganic peroxide such as potassium persulfate as well as any of these peroxides in combination with ferrous sulfate which is one of redox catalysts or the like. Any of these radical initiators may be used alone or in combination of two or more.

For the purpose of adjusting the molecular weight of a conjugated diene-based rubber, a chain transferring agent including an alkylmercaptan such as tert-dodecylmercaptan and n-dodecylmercaptan, carbon tetrachloride, a thioglycol, diterpene, terpinolene, γ-terpinene, and the like can also be employed.

A polymerization can be effected in an oxygen-free reaction vessel at a temperature of 0 to 100° C., and an especially preferred polymerization temperature ranges from 0 to 80° C. The polymerization may be of a continuous process or a batch process, and the operating conditions or the like such as the polymerization temperature or the like and the stirring manner or the like can appropriately be changed in the course of the reaction. The polymerization can be terminated, once a predetermined conversion of the polymerization is accomplished, by adding an inhibitor. Such inhibitor may for example be an amine compound such as hydroxylamine, diethylhydroxylamine, and the like or a quinone compound or the like such as hydroquinone or the like.

After terminating the polymerization, a resultant conjugated diene-based rubber latex is made free from unreacted monomers if necessary by means of steam distillation and the like, and then supplemented with a salt such as sodium chloride, potassium chloride and calcium chloride together with hydrochloric acid, nitric acid or sulfuric acid if necessary to allow the conjugated diene-based rubber to be aggregated as crumb. This crumb is washed, dehydrated and then dried with a drier or the like, whereby obtaining a conjugated diene-based rubber.

The oil extended rubber in the present invention contains a conjugated diene-based rubber and an extending oil.

The Mooney viscosity [$ML_{1+4}$ (100° C.)] of the conjugated diene-based rubber constituting the oil extended rubber is 40 to 200 and is preferably 70 to 170. The Mooney viscosity less than 40 leads to a reduced wearing resistance of a vulcanized rubber obtained. On the other hand, the viscosity exceeding 200 leads to a poor processability of a rubber composition containing this oil extended rubber.

The extending oil described above is not particularly limited, it may be used an aromatic-based oil, a naphthene-based oil and a paraffin-based oil. Any of these oils may be used alone or in combination of two or more. Among these oils, an aromatic-based extending oil is preferred particularly.

The extending oil described above may be present in an amount of 10 to 60 parts, preferably 20 to 50 parts, based on 100 parts by mass (hereinafter abbreviated as parts) of the conjugated diene-based rubber. An amount of the extending oil less than 10 parts leads to an insufficient improvement in the processability, while an amount exceeding 60 parts is also problematic since the ratio of the extending oil to be incorporated during the preparation of the rubber composition for obtaining a required processability is limited. The Mooney viscosity [$ML_{1+4}$ (100° C.)] of an oil extended rubber obtained is preferably 20 to 180, more preferably 30 to 150.

The oil extended rubber in the invention can be obtained by mixing an aqueous solution of an emulsifier and an extending oil, preparing an emulsion of the extending oil for example by stirring, mixing with a conjugated diene-based rubber latex, and then aggregating by the method described above.

The rubber composition in the present invention contains a rubber component containing the conjugated diene-based rubber described above and at least one selected from an inorganic filler and a carbon black. The conjugated diene-based rubber described above is in an amount of preferably 30 parts or more, more preferably 40 parts or more, based on 100 parts of the total of the rubber components. The Mooney viscosity [$ML_{1+4}$ (100° C.)] of the conjugated diene-based rubber is 20 to 200 and is preferably 30 to 150.

Other conjugated diene-based rubber may be employed as a rubber component constituting the rubber composition. Such rubber component may be used a styrene-butadiene copolymeric rubber, a butadiene rubber, an isoprene rubber, a butadiene-isoprene copolymeric rubber, a butadiene-styrene-isoprene copolymeric rubber, an acrylonitrile-butadiene copolymeric rubber, a natural rubber, a chloroprene rubber and the like.

The rubber composition can be that further includes an extending oil. The extending oil described above may be present in an amount of 10 to 60 parts, preferably 20 to 50 parts, based on 100 parts by mass of the conjugated diene-based rubber. When the extending oil is employed, the Mooney viscosity [$ML_{1+4}$ (100° C.)] of the conjugated diene-based rubber is preferably 40 to 200.

The inorganic filler used in the rubber composition may be employed silica, aluminum hydroxide, composite oxide contained silicon oxide such as a composite oxide formed by silicon oxide and at least one selected from aluminium oxide, calcium oxide and magnesium oxide, zinc oxide, clay, calcium carbonate, magnesium carbonate and the like. Among these, silica is prefered. Such silica is not particularly limited and may be any one used generally as a bright color reinforcing agent for a synthetic rubber. While the type of a silica is not particularly limited, a wet process type white carbon, a dry process type white carbon, a colloidal silica and a precipitated silica and the like described in Japanese Patent laid-open publication 62-62838 can be employed. Among those listed above, a wet process type white carbon whose main component is silicic hydrate is preferred particularly. Any of these silica-based compound may be employed alone or in combination of two or more. While the specific surface area of the silica is not particularly limited, a nitrogen absorption specific surface area (area determined by BET method in accordance with ASTM D3037-81) is usually 50 to 400 $m^2/g$, preferably 50 to 220 $m^2/g$, more preferably 70 to 220 $m^2/g$, for the purpose of achieving a sufficient improvement in the reinforcing performance, the wearing resistance and the exothermic behavior, and the like.

In the case the inorganic filler such as a silica is employed alone, it may preferably be present in an amount of 10 to 200 parts, particularly 20 to 100 parts based on 100 parts of a total rubber component. An amount of the inorganic filler less than 10 parts leads to an insufficient reinforcing effect, resulting in a poor wet skid property of a vulcanized rubber obtained or the like. A sufficient reinforcing effect can be accomplished when the filler amounts to 200 parts, and no further amount is required.

While the type of the carbon black described above is not particularly limited, those which may be employed are a furnace black, an acetylene black, a thermal black, a channel black, a graphite, and the like. Among those listed above, a furnace black is preferred including SAF, ISAF, ISAF-HS, ISAF-LS, IISAF-HS, HAF, HAF-HS, HAF-LS, FEF, and the like. Any of these carbon blacks may be employed alone or in combination of two or more.

While the nitrogen absorption specific surface area of a carbon black determined similarly to a silica is not particularly limited, it is usually 5 to 200 m²/g, preferably 50 to 150 m²/g, more preferably 80 to 130 m²/g, for the purpose of achieving a sufficient improvement in the tensile strength and the wearing resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in the tensile strength and the wearing resistance, and the like. A further improvement in the wearing resistance can be achieved by using as a carbon black a high structure carbon black described in Japanese Patent laid-open publication 5-230290, whose cetyltrimethylammonium bromide absorption specific surface area is 110 to 170 m²/g and whose DBP (24M4DBP) oil absorption level after compressing under 165 MPa four times repetitively is 110 to 130 ml/100 g.

In the case carbon black is employed alone, it may preferably be present in an amount of 10 to 200 parts, particularly 30 to 150 parts based on 100 parts of a total rubber component. An amount of the carbon black less than 10 parts leads a vulcanized rubber having a reduced wearing resistance.

Carbon black may be employed with the inorganic filler described above. When the inorganic filler is a silica, the total amount is preferably 10 to 200 parts, especially 30 to 150 parts based on 100 parts of the rubber component containing the conjugated diene-based rubber in the case of employing the silica and the carbon black concomitantly. A total amount less than 10 parts leads to an insufficient reinforcing effect, resulting in a poor wet skid property of a vulcanized rubber obtained or the like. A sufficient reinforcing effect can be accomplished when the total amount is 200 parts, and no further amount is required. While the ratio between a silica and a carbon black is not particularly limited, 100 parts of the silica is combined preferably with 2 to 400 parts, especially 5 to 300 parts of the carbon black. Within this range of the ratio, a vulcanized rubber which is excellent in all of the wet skid property, the repelling elasticity and the tensile strength can be obtained.

In the case of at least 30 parts of the conjugated diene-based rubber is contained in 100 parts of the rubber component, content is preferably 30 to 100 parts of the silica and/or 10 to 100 parts of the carbon black, more preferably 30 to 90 parts of the silica and/or 10 to 90 parts of the carbon black. A carbon-silica dual-phase filler and the like may be also added for purpose of reinforcing the rubber product.

In addition to the components described above, other additives such as vulcanizing agents, silane coupling agents, anti-aging agents, processing aids and the like may also be employed.

While a representative vulcanizing agent is sulfur, other materials such as sulfur-containing compounds and peroxides or the like may also be employed. Such vulcanizing agent is present preferably in an amount usually of 0.5 to 10 parts, especially 1 to 6 parts, based on 100 parts of a rubber component.

When using a vulcanizing agent, a vulcanizing accelerator, a vulcanizing aid and the like may also be employed. Such vulcanizing accelerator may be used an aldehyde ammonia-based vulcanizing accelerator such as hexamethylenetetramine;

a sulfenamide-based vulcanization accelerator such as N-cyclohexyl-2-benzothiazolesulfenamide, N-tert-butyl-2-benzothiazolesulfenamide, N-oxyethylene-2-benzothiazolesulfenamide and N,N'-diisopropyl-2-benzothiazolesulfenamide, a guanidine-based vulcanization accelerator such as diphenylguanidine, diorthotolylguanidine and orthotolylbiguanidine and a thiourea-based vulcanization accelerator such as thiocarboanilide, diorthotolylthiourea, ethylene thiourea, diethylthiourea and trimethylthiourea;

a thiazol-based vulcanization accelerator such as 2-mercaptobenzothiazol, dibenzothiazyldisulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole and thiuram-based vulcanization accelerator such as tetramethylthiuram monosulfide, tetramethylthiuram disulfide, tetraethylthiuram disulfide, tetrabutylthiuram disulfide and dipentamethylenethiuram tetrasulfide;

a dithiocarbamate-based vulcanization accelerator such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethylamine diethyldithiocarbamate, piperidine pentamethylene dithiocarbamate and pipecolin methylpentamethylene dithiocarbamate and xanthate-based vulcanization accelerator such as sodium isopropylxanthate, zinc isopropylxanthate and zinc butylxanthate, and the like.

Any of these may be used alone or in combination of two or more. This component may be present preferably in an amount of 0.5 to 15 parts, especially 1 to 10 parts based on 100 parts of a rubber component.

When a silica is added to a rubber composition of the invention, the wearing resistance and the tanδ of a resultant vulcanizing rubber can further be improved by further adding a silane coupling agent.

The silane coupling agent is not particularly limited, it may be used vinyltrichlorosilane, vinyltriethoxysilane, vinyltris(β-methoxy-ethoxy)silane, β-(3,4-epoxycyclohexyl)-ethyltrimethoxysilane, γ-glycidoxypropyl trimethoxysilane, γ-glycidoxypropylmethyl diethoxysilane, γ-methacryloxypropyl trimethoxysilane, N-(β-aminoethyl)-γ-aminopropyl trimethoxysilane, N-(β-aminoethyl)-γ-aminopropyltrimethyl dimethoxysilane, N-phenyl-γ-aminopropyl trimethoxysilane, γ-chloropropyl trimethoxysilane, γ-mercaptopropyl trimethoxysilane and γ-aminopropyl trimethoxysilane.

Those which can also be employed are bis-[3-(triethoxysilyl)propyl] tetrasulfide, bis-[3-(triethoxysilyl) propyl] disulfide, γ-trimethoxysilylpropyl dimethylthiocarbamyl tetrasulfide, γ-trimethoxysilylpropyl benzothiazyl tetrasulfide, and the like. Any of such silane coupling agents may be used alone or in combination of two or more.

A silane coupling agent is present preferably in an amount of 1 to 20 parts, especially 2 to 15 parts, based on 100 parts of the silica.

A rubber composition according to the invention and a rubber product employing the same can be produced as described below.

First, a rubber component comprising a conjugated diene-based rubber or an oil extended rubber, an inorganic filler such as a silica, a carbon black, a reinforcing agent such as a carbon-silica dual phase filler or the like, an extending oil for rubber and other auxiliary components or the like are kneaded using a kneader such as Banbury mixer or the like at a temperature of 70 to 180° C. Subsequently, the kneaded mixture is cooled and combined with a vulcanizing agent such as a sulfur or the like and a vulcanization accelerator or the like using Banbury mixer, a mixing roll, and the like to mold into a desired shape. A vulcanization at a temperature of 140 to 180° C. is then effected to obtain a desired vulcanized rubber, i.e., a rubber product.

A vulcanized rubber obtained by employing a rubber composition according to the invention has excellent wet skid property, repelling elasticity, and the like together with sufficient wearing resistance, tensile strength, and the like as well as a satisfactory processability, thus being useful as a rubber composition for a tire, especially as a tire tread.

DESCRIPTION OF THE PREFERRED EMBODIMENTS

Figure 1:
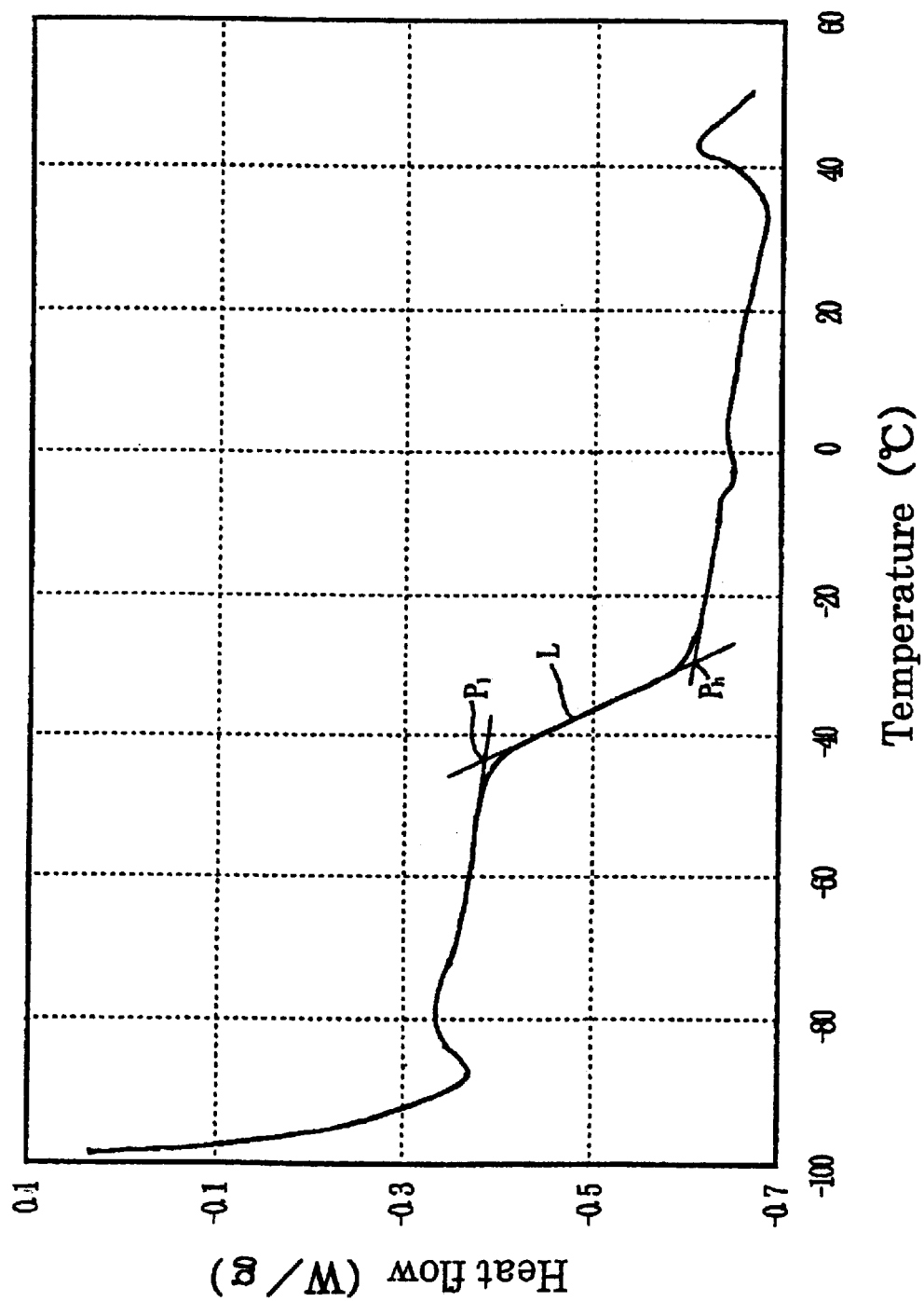
FIG. 1 shows a DSC chart representing the way of obtaining the extrapolated initiation and termination temperature of the glass transition of a conjugated diene-based rubber before being extended with an extending oil in Production Example 1.

The present invention is further described in detail in the following Examples.

(1) Production of Oil Extended Conjugated Diene-based Rubber

Production Example 1

Oil Extended Conjugated Diene-based Rubber [A]

In a polymerization vessel, 200 parts of water, 4.5 parts of rosin acid soap, 66 parts of butadiene, 26 parts of styrene and 5 parts of acrylonitrile were charged. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to the polymerization vessel, whereby initiating the polymerization. Once the conversion of the polymerization reached 30%, additional 3 parts of acrylonitrile was added and then at the conversion of the polymerization reaching 60% diethylhydroxylamine was added to terminate the polymerization. Subsequently, any unreacted polymer was recovered by steam stripping, and a conjugated diene-based rubber latex was obtained.

Then 100 parts of the solid contained in this latex was combined with an emulsion containing 37.5 parts of an aromatic oil (FUJIKOSAN Co., Ltd., Trade name: "Fucoal Aromax #3"), and then aggregated with sulfuric acid and sodium chloride to obtain crumb. Then the crumb was dried by a hot air blower to obtain a conjugated diene-based rubber [A] which was extended with an aromatic oil.

The conjugated diene-based rubber ① contained in the latex had the Mooney viscosity of 127, the bound acrylonitrile content of 10% by mass, the bound styrene content of 20% by mass, the weight-average molecular weight of 640,000, the glass transition point of −43° C. and the difference between the extrapolated temperatures of the initiation and the termination of the glass transition of 11° C. The Mooney viscosity of the oil extended conjugated diene-based rubber [A] was 49.

The extrapolated temperatures of the initiation and the termination of the glass transition were determined by a differential scanning calorimeter (DSC) in accordance with ASTM D3418-82 (reapproved 1988). The extrapolated initiation temperature was the reading on the temperature axis corresponding to the point at which the line extending from the low temperature baseline intersects with the line extending from the almost linear part L between the low temperature inflection point $P_l$ and the high temperature inflection point $P_h$ in the temperature elevation curve of the DSC shown in FIG. 1. The extrapolated termination temperature was the reading on the temperature axis corresponding to the point at which the line extending from the high temperature baseline intersects with the line extending from the linear part L in the temperature elevation curve of the DSC shown in FIG. 1.

Production Example 2

Oil Extended Conjugated Diene-based Rubber [B]

In a polymerization vessel, 200 parts of water, 4.5 parts of rosin acid soap, 69 parts of butadiene, 19 parts of styrene and 7 parts of acrylonitrile were charged. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to the polymerization vessel, whereby initiating the polymerization. Once the conversion of the polymerization reached 30%, additional 5 parts of acrylonitrile was added and then at the conversion of the polymerization reaching 60% diethylhydroxylamine was added to terminate the polymerization. Subsequently, a conjugated diene-based rubber B extended with an aromatic oil was obtained similarly to Production Example 1.

The conjugated diene-based rubber ② contained in the latex had the Mooney viscosity of 132, the bound acrylonitrile content of 14% by mass, the bound styrene content of 15% by mass, the weight-average molecular weight of 640,000, the glass transition point of −45° C. and the difference between the extrapolated temperatures of the initiation and the termination of the glass transition of 12° C. The Mooney viscosity of the oil extended conjugated diene-based rubber [B] was 45.

Production Example 3

Oil Extended Conjugated Diene-based Rubber [C]

In a polymerization vessel, 200 parts of water, 4.5 parts of rosin acid soap, 66 parts of butadiene, 26 parts of styrene and 8 parts of acrylonitrile were charged. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to the polymerization vessel, whereby initiating the polymerization. Once the conversion of the polymerization reached 60% diethylhydroxylamine was added to terminate the polymerization.

Subsequently, a conjugated diene-based rubber C extended with an aromatic oil was obtained similarly to Production Example 1.

The conjugated diene-based rubber ③ contained in the latex had the Mooney viscosity of 125, the bound acrylonitrile content of 10% by mass, the bound styrene content of 20% by mass, the weight-average molecular weight of 640,000, the glass transition point of −41° C. and the difference between the extrapolated temperatures of the initiation and the termination of the glass transition of 25° C. The Mooney viscosity of the oil extended conjugated diene-based rubber [C] was 47.

Production Example 4

Oil Extended Conjugated Diene-based Rubber [D]

In a polymerization vessel, 200 parts of water, 4.5 parts of rosin acid soap, 58 parts of butadiene and 42 parts of styrene were charged. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to the polymerization vessel, whereby initiating the polymerization. Once the conversion of the polymerization reached 60% diethylhydroxylamine was added to terminate the polymerization.

Subsequently, a conjugated diene-based rubber [D] extended with an aromatic oil was obtained similarly to Production Example 1.

The conjugated diene-based rubber ④ contained in the latex had the Mooney viscosity of 126, the bound styrene content of 35% by mass, the weight-average molecular weight of 760,000 and the glass transition point of −40° C. The Mooney viscosity of the oil extended conjugated diene-based rubber [D] was 47. The physical properties of the conjugated diene-based rubber and the oil extended conjugated diene-based rubber is shown in Table 1.

TABLE 1

| Conjugated diene-based rubber | ① | ② | ③ | ④ |
|---|---|---|---|---|
| Tg (° C.) | −43 | −45 | −41 | −40 |
| The difference between the extrapolated temperatures of the initiation and the termination of the Tg (° C.) | 11 | 12 | 25 | — |
| Mooney viscosity [$ML_{1+4}$(100° C.)] | 127 | 132 | 125 | 126 |
| Oil extended rubber | A | B | C | D |
| Mooney viscosity [$ML_{1+4}$(100° C.)] | 49 | 45 | 47 | 47 |

The bound contents of acrylonitrile and styrene in the conjugated diene-based rubbers ① to ④ were determined as described (a) and (b). And the other respective mechanical parameters were determined as described (c) to (e).

(a) Bound acrylonitrile content (% by mass); A rubber was dissolved in toluene and re-precipitated from methanol, and this procedure was repeated twice to purify the rubber, which was then dried in vacuum, subjected to an elemental analysis to obtain a nitrogen content, from which the bound content was calculated.

(b) Bound styrene content (% by mass); A rubber was dissolved in toluene and re-precipitated from methanol, and this procedure was repeated twice to purify the rubber, which was then dried in vacuum, subjected to an infrared absorption spectroscopy to obtain a calibration curve, from which the bound content was obtained.

(c) Glass transition point; A glass transition point was determined using a differential scanning calorimeter manufactured by SEIKO DENSI KOGYO in accordance with ASTM D3418-82 (reapproved 1988). The glass transition point was the extrapolated temperatures of the initiation of the glass transition.

(d) Mooney viscosity [$ML_{1+4}$ (100° C.)]; A measurement was in accordance with JIS K 6300-1994 at 100° C. with the preliminary heating for 1 minute and the measuring period of 4 minutes.

(e) Weight-average molecular weight (Mw); A GPC (gel permeation chromatography) was eployed and represented as a standard polystyrene.

(2) Preparation of Rubber Compositions and Vulcanized Rubbers

Each of the oil extended conjugated diene-based rubbers [A] to [D] of Production Examples 1 to 4 was employed together with the respective composition shown in Table 2 and 3, and kneaded using a LABOPLASTMILL (TOYOSEIKI Co., Ltd.) to obtain the rubber compositions of Examples 1 to 6 and Comparatives 1 to 4. After vulcanizing by a vulcanization press at 160° C. for 20 minutes, the vulcanized rubbers were obtained. Each of these rubber compositions of these Examples and Comparatives was examined for the processability, the Mooney viscosity and the mechanical characteristics of the respective vulcanized rubber. The results are shown also in Table 2 and 3. Mixture of the oil extended rubbers which each of the conjugated diene-based rubber ① described above and styrene-butadiene rubber (JSR Corp., Trade name: "SBR0120") was extended with the aromatic oil is employed in Example 6. And mixture of the oil extended rubbers which each of the conjugated diene-based rubber ③ described above and the abovementioned styrene-butadiene rubber was extended with the aromatic oil is employed in Comparative example 4. The oil extended rubbers are prepared to be contained 37.5 parts by mass of the aromatic oil based on 100 parts by mass of the solid content of the rubber components.

The components incorporated in the formulations described above were as follows.

① Silica; NIPPON SILICA INDUSTRIAL Co., Ltd., Trade name: "NIPSIL AQ"

② Silane coupling agent; DEGUSA HULS, Trade name: "Si69"

③ Carbon black; MITSUBISHI CHEMICAL CORPORATION, Trade name: "DIABLACK H"

④ Anti-aging agent; OUCHISHINKO CHEMICAL INDUSTRIAL CO., LTD., Trade name: "NOCRAC 810NA"

⑤ Vulcanization accelerator (I); OUCHISHINKO CHEMICAL INDUSTRIAL CO., LTD., Trade name: "NOCCELER CZ"

⑥ Vulcanization accelerator (II); OUCHISHINKO CHEMICAL INDUSTRIAL CO., LTD., Trade name: "NOCCELER D"

The mechanical characteristics or the like were determined as described below. The Mooney viscosity of the rubber composition was determined similarly to the oil extended conjugated diene-based rubber.

(a) Processability; A rubber composition was evaluated based on its winding around a roll upon kneaded using the roll. The evaluation criteria are shown below. ◯: Excellent with no separation form roll surface. Δ: Winding possible with slight separation. X: Extremely poor with almost no winding.

(b) Tensile characteristics: In accordance with JIS K 6301-1995 using a type 3 test piece, the elongation at break and the tensile strength were determined at 25° C. and the tensile speed of 500 mm/min.

(c) Repelling elasticity; A repelling elasticity was determined using DUNLOP TRIPHTHOMETER at 50° C.

(d) tan δ; A tan δ was determined using a dynamic analyzer (RDA) manufactured by RHEOMETRIX in United States at the dynamic strain of 3%, the frequency of 10 Hz and the temperatures of 0° C. and 50° C. A larger value at 0° C. reflects a higher wet skid resistance as a preferable property. A smaller value at 50° C. reflects a smaller rolling resistance as a preferable property.

(e) Lambourn wear Index; A wearing level was calculated at the slip rate of 60% using a Lambourn wear tester. The measurement was made at 50° C. A higher Index reflects a better wearing resistance.

TABLE 2

|  |  | Example | | | | | |
|---|---|---|---|---|---|---|---|
|  |  | 1 | 2 | 3 | 4 | 5 | 6 |
| Rubber Component | Conjugated diene-based rubber ① | 100 | 100 |  |  | 100 | 70 |
|  | Conjugated diene-based rubber ② |  |  | 100 | 100 |  |  |
|  | Conjugated diene-based rubber ③ |  |  |  |  |  |  |
|  | Conjugated diene-based rubber ④ |  |  |  |  |  |  |
|  | Styrene-butadiene rubber |  |  |  |  |  | 30 |
| Aromatic oil added to rubber component | | 37.5 | 37.5 | 37.5 | 37.5 | 37.5 | 37.5 (26.25 + 11.25) |
| Silica | | 60 | 60 | 60 | 60 | 70 | 0 |
| Carbon black | | 10 | 10 | 10 | 10 | 0 | 80 |
| Silane coupling agent | | 6 | 3 | 6 | 3 | 7 | 0 |
| Zinc oxide | | 3 | 3 | 3 | 3 | 3 | 3 |
| Stearic acid | | 2 | 2 | 2 | 2 | 2 | 2 |
| Anti-aging agent | | 1 | 1 | 1 | 1 | 1 | 1 |
| Sulfur | | 1.5 | 2.2 | 1.5 | 2.2 | 1.5 | 1.5 |
| Vulcanization accelerator | | | | | | | |
| (I) | | 1.5 | 1.5 | 1.5 | 1.5 | 1.5 | 1 |
| (II) | | 1 | 1 | 1 | 1 | 1 | 0 |
| Processability | | ○ | ○ | ○ | ○ | ○ | ○ |
| Mooney viscosity [$ML_{1+4}$ (100° C.)] | | 75 | 86 | 81 | 92 | 80 | 80 |
| Elongation (%) | | 750 | 790 | 730 | 760 | 720 | 700 |
| Tensile strength (MPa) | | 28 | 28 | 27 | 27 | 28 | 29 |
| Impact resilience (%) | | 50 | 49 | 51 | 49 | 51 | 48 |
| 3% tanδ | | | | | | | |
| 0° C. | | 0.314 | 0.031 | 0.524 | 0.498 | 0.319 | 0.295 |
| 50° C. | | 0.140 | 0.130 | 0.145 | 0.132 | 0.135 | 0.159 |
| Lambourn wear Index | | 120 | 110 | 128 | 122 | 117 | 140 |

TABLE 3

|  | Comparative example | | | |
|---|---|---|---|---|
|  | 1 | 2 | 3 | 4 |
| Rubber component | | | | |
| Conjugated diene-based rubber ① | | | | |
| Conjugated diene-based rubber ② | | | | |
| Conjugated diene-based rubber ③ | | | 100 | 70 |
| Conjugated diene-based rubber ④ | 100 | 100 | | |
| Styrene-butadiene rubber | | | | 30 |
| Aromatic oil added to rubber component | 37.5 | 37.5 | 37.5 | 37.5 (26.25 + 11.25) |
| Silica | 60 | 60 | 60 | 0 |
| Carbon black | 10 | 10 | 10 | 80 |
| Silane coupling agent | 6 | 3 | 3 | 0 |
| Zinc oxide | 3 | 3 | 3 | 3 |
| Stearic acid | 2 | 2 | 2 | 2 |
| Anti-aging agent | 1 | 1 | 1 | 1 |
| Sulfur | 1.5 | 2.2 | 2.2 | 1.5 |
| Vulcanization accelerator | | | | |
| (I) | 1.5 | 1.5 | 1.5 | 1 |
| (II) | 1 | 1 | 1 | 0 |
| Processability | ○ | Δ | Δ | Δ |
| Mooney viscosity [$ML_{1+4}$(100° C.)] | 77 | 92 | 94 | 85 |
| Elongation (%) | 700 | 740 | 760 | 680 |
| Tensile strength (MPa) | 26 | 26 | 28 | 29 |
| Impact resilience (%) | 50 | 51 | 50 | 46 |
| 3% tanδ | | | | |
| 0° C. | 0.288 | 0.271 | 0.290 | 0.267 |
| 50° C. | 0.142 | 0.130 | 0.130 | 0.168 |
| Lambourn wear Index | 100 | 83 | 110 | 135 |

The Mooney viscosity in Table 2 was the value of a rubber composition after incorporating an inorganic filler and other additives.

Based on the results shown in Table 2, any of the rubber compositions of Examples 1 to 6 exhibited an excellent processability and gave a vulcanized rubber whose mechanical characteristics were satisfactory. As a result of a large tanδ at 0° C. and a small tanδ at 50° C., a tire having a high wet skid resistance and a low rolling resistance is expected to be obtained. In addition, the Lambourn wear Index is sufficiently high, indicating that a vulcanized rubber having an excellent wearing resistance can be obtained. In each of Examples 2 and 4 where a reduced amounts of the silane coupling agent was added, the increase in the Mooney viscosity was limited to a small extent and a tensile strength and a wearing resistance which were equivalent to those in other Examples were obtained, indicating that a rubber composition and a vulcanized rubber having excellent performances were obtained even when a reduced amount of the silane coupling agent was employed. The vulcanized rubber in Example 5 which contains silica and no carbon black was shown the performance almost equivalent to Example 1.

On the other hand, the conjugated diene-based rubber ③ produced by adding the entire amount of acrylonitrile all at once before initiating the polymerization instead of adding portionwise over the polymerization process exhibited a large difference between the initiation and termination temperatures of the glass transition, and it exhibited, when employed in Comparative 3, a poor processability and an insufficiently improved tanδ at 0° C. in Table 3. Each of Comparatives 1 and 2, using the conjugated diene-based rubber ④ which was produced without using acrylonitrile, exhibited a markedly deteriorated processability due to the reduced amount of the silane coupling agent, as well as an insufficiently improved tanδ at 0° C. and a low Lambourn wear Index.

What is claimed is:

1. A conjugated diene-based rubber obtained by copolymerizing monomers containing an olefinically unsaturated nitrile monomer, an aromatic vinyl monomer and a conjugated diene monomer, and is characterized in that the glass transition point of said conjugated diene-based rubber is −60 to 0° C., the difference between the extrapolated temperatures of the initiation and the termination of said glass transition is 20° C. or less, that has a repeating unit comprising ① 9 to 30% by mass of an olefinically unsaturated nitrile monomer unit, ② 10 to 50% by mass of an aromatic vinyl monomer unit and ③ 20 to 81% by mass of a conjugated diene monomer unit [where the total of ①, ② and ③ is 100% by mass], and that Mooney viscosity [$ML_{1+4}$ (100° C.)] is 20 to 200.

2. A method for producing a conjugated diene-based rubber according to claim 1 by copolymerizing monomers containing an olefinically unsaturated nitrile monomer, an aromatic vinyl monomer and a conjugated diene monomer, wherein polymerization is carried by adding said olefinically unsaturated nitrile monomer portionwise to polymerization system comprising an aromatic vinyl monomer and a conjugated diene monomer and then by adding the remainder of said olefinically unsaturated nitrile monomer intermittently to polymerization system in the case conversion of the total of the charged monomer measured in the course of polymerization is reached 10 to 95%.

3. A method for producing a conjugated diene-based rubber according to claim 2 wherein, the initial amount of said olefinically unsaturated nitrile monomer added to the polymerization system is 20 to 95% by mass with respect to the total amount of said olefinically unsaturated nitrile monomer to be used.

4. A method for producing a conjugated diene-based rubber according to claim 1 by copolymerizing monomers containing an olefinically unsaturated nitrile monomer, an aromatic vinyl monomer and a conjugated diene monomer, wherein polymerization is carried by adding said olefinically unsaturated nitrile monomer portionwise to polymerization system comprising an aromatic vinyl monomer and a conjugated diene monomer and then by adding the remainder of said olefinically unsaturated nitrile monomer continuously to polymerization system in the case conversion of the total of the charged monomer measured in the course of polymerization is reached 10 to 95%.

5. The method for producing a conjugated diene-based rubber according to claim 4 wherein, the initial amount of said olefinically unsaturated nitrile monomer added to the polymerization system is 20 to 95% by mass with respect to the total amount of said olefinically unsaturated nitrile monomer to be used.

6. An oil extended rubber being characterized in that comprising 100 parts by mass of a conjugated diene-based rubber which is obtained by copolymerizing monomers containing an olefinically unsaturated nitrile monomer, an aromatic vinyl monomer and a conjugated diene monomer, whose the glass transition point of said conjugated diene-based rubber is −60 to 0° C., whose difference between the extrapolated temperatures of the initiation and the termination of said glass transition is 20° C. or less, whose repeating unit is comprised ① 9 to 30% by mass of an olefinically unsaturated nitrile monomer unit, ② 10 to 50% by mass of an aromatic vinyl monomer unit and ③ 20 to 81% by mass of a conjugated diene monomer unit [where the total of ①, ② and ③ is 100% by mass], and whose Mooney viscosity [$ML_{1+4}$ (100° C.)] is 40 to 200, and 10 to 60 parts by mass of an extending oil.

7. A rubber composition being characterized in that comprising 100 parts by mass of a rubber component containing a conjugated diene-based rubber obtained by copolymerizing monomers containing an olefinically unsaturated nitrile monomer, an aromatic vinyl monomer and a conjugated diene monomer, whose the glass transition point of said conjugated diene-based rubber is −60 to 0° C., whose difference between the extrapolated temperatures of the initiation and the termination of said glass transition is 20° C. or less, whose repeating unit is comprised ① 9 to 30% by mass of an olefinically unsaturated nitrile monomer unit, ② 10 to 50% by mass of an aromatic vinyl monomer unit and ③ 20 to 81% by mass of a conjugated diene monomer unit [where the total of ①, ② and ③ is 100% by mass], and whose Mooney viscosity [$ML_{1+4}$ (100° C.)] is 20 to 200, and 10 to 200 parts by mass of at least one selected from an inorganic filler and a carbon black.

8. The rubber composition according to claim 7, wherein said inorganic filler is silica.

9. The rubber composition according to claim 8 further comprising a silane coupling agent.

10. The rubber composition according to claim 8, wherein said conjugated diene-based rubber is in an amount of at least 30 parts by mass in the total of said rubber component of 100 parts by mass, and the amount of said silica is 30 to 100 parts by mass and/or the amount of said carbon black is 10 to 100 parts by mass based on 100 parts by mass of the total of said rubber component.

11. The rubber composition according to claim 10 further comprising a silane coupling agent.

12. The rubber composition according to claim 7 further comprising 10 to 60 parts by mass of an extending oil based on 100 parts by mass of said rubber component and the Mooney viscosity [$ML_{1+4}$ (100° C.)] of said conjugated diene-based rubber is 40 to 200.

13. The rubber composition according to claim 12, wherein said inorganic filler is silica.

14. The rubber composition according to claim 13 further comprising a silane coupling agent.

15. The rubber composition according to claim 13, wherein said conjugated diene-based rubber is in an amount of at least 30 parts by mass in the total of said rubber component of 100 parts by mass, and the amount of said silica is 30 to 100 parts by mass and/or the amount of said carbon black is 10 to 100 parts by mass based on 100 parts by mass of the total of said rubber component.

16. The rubber composition according to claim 15 further comprising a silane coupling agent.

17. The conjugated diene-based rubber according to claim 1, wherein said olefinically unsaturated nitrile monomer is acrylonitrile or methacrylonitrile.

18. The conjugated diene-based rubber according to claim 1, wherein said aromatic vinyl monomer is selected from the group consisting of styrene, 2-methylstyrene, 3-methylstyrene, 4-methylstyrene, α-methylstyrene, 2,4-dimethyistyrene, 2,4- diisopropylstyrene, 4-tert-butylstyrene, and tert-butoxystyrene.

19. The conjugated diene-based rubber according to claim 1, wherein said conjugated diene monomer is selected from the group consisting of 1,3-butadiene, isoprene, 2,3-dimethyl- 1,3-butadiene, and chloroprene.

20. The conjugated diene-based rubber according to claim 1, wherein said conjugated diene-based rubber further is obtained by copolymerizing monomers, which contain an ester-based monomer selected from the group consisting of methyl (meth)acrylate, ethyl (meth)acrylate, n-propyl (meth)acrylate, isopropyl (meth)acrylate, n-amyl (meth)acrylate, n-hexyl (meth)acrylate, 2-ethylhexyl (meth)acrylate, cyclohexyl (meth)acrylate, and vinyl acetate, with said olefinically unsaturated nitrile monomer, said aromatic vinyl monomer and said conjugated diene monomer.

21. The rubber composition according to claim 7, wherein said aromatic vinyl monomer is selected from the group consisting of styrene, 2-methylstyrene, 3-methylstyrene, 4-methylstyrene, α-methylstyrene, 2,4-dimethylstyrene, 2,4-diisopropylstyrene, 4-tert- butylstyrene, and tert-butoxystyrene.

22. The rubber composition according to claim 7, wherein said conjugated diene monomer is selected from the group consisting of 1,3-butadiene, isoprene, 2,3- dimethyl-1,3-butadiene, and chloroprene.

* * * * *